United States Patent

[11] 3,570,362

| [72] | Inventors | Leslie Parkin<br>Bobbers Mill;<br>Sydney Alan Andrews, Stapleford, England |
|---|---|---|
| [21] | Appl. No. | 820,093 |
| [22] | Filed | Apr. 29, 1969 |
| [45] | Patented | Mar. 16, 1971 |
| [73] | Assignee | United-Carr Incorporated<br>Boston, Mass. |
| [32] | Priority | May 7, 1968 |
| [33] | | Great Britain |
| [31] | | 21546/68 |

[54] RATCHET PLATE
3 Claims, 4 Drawing Figs.

[52] U.S. Cl. ........................................... 85/36
[51] Int. Cl. ........................................ F16b 21/20
[50] Field of Search .............................. 85/36; 24/110

[56] References Cited
UNITED STATES PATENTS

| 2,308,412 | 1/1943 | Ballou, Jr. et al. | 24/110 |
| 2,381,315 | 8/1945 | Smith et al. | 85/36 |
| 2,715,350 | 8/1955 | Bedford | 85/36 |
| 2,746,340 | 5/1956 | Sislik | 85/36 |
| 3,228,716 | 1/1966 | Parkin | 85/36 |

*Primary Examiner*—Edward C. Allen
*Attorneys*—Philip E. Parker, Gordon Needlemen, James R. O'Connor, John Todd and Hall and Houghton ABSTRACT: A ratchet plate having a resilient tongue for gripping a rod inserted through an aperture in the plate, the tongue having at least one integral arm extending over the base so as to be engageable by a tool to flex the tongue out of gripping engagement with the rod when the ratchet plate is to be removed.

Patented March 16, 1971 3,570,362

INVENTORS:
Leslie Parkin and
BY Sydney Alan Andrews
Gordon Needlemar
ATTORNEY

RATCHET PLATE

This invention relates to a ratchet plate for assembly with a shaft, rod or the like.

According to the present invention, a ratchet plate formed of spring steel comprises a platelike base having an aperture through which the shaft, rod or the like is adapted to be inserted, a resilient tongue being provided integral with the base at a portion of the edge of the aperture, the free edge of the tongue defining an edge adapted to make frictional engagement with a shaft, rod or the like when inserted into the aperture, the tongue being provided with an extension overlying the base in spaced relation thereto for engagement by a tool to effect hinging movement of the tongue relative to the base to release its gripping action on an inserted shaft, rod or the like.

Preferably the said means comprise two arms extending transversely of the base from opposite sides of the tongue and extending along opposite sides of the aperture.

A further tongue may be provided at the portion of the edge of the aperture in opposed relation to the first mentioned tongue and so arranged that when a shaft, rod or the like is inserted through the aperture, opposed surfaces are frictionally gripped by the two tongues.

To enable the invention to be fully understood, it will now be described, by way of example, with reference to the accompanying drawings in which.

Figure 3:
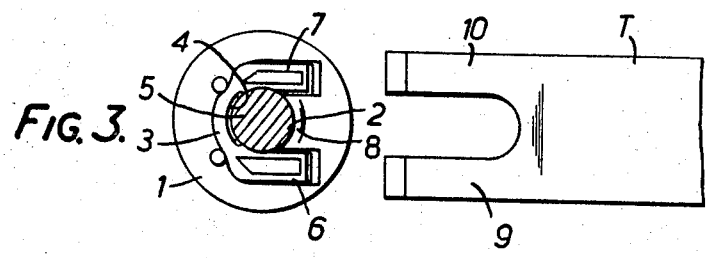
FIG. 3 is a plan view of the ratchet plate assembled on a rod, a tool being shown for effecting the release of the ratchet plate.
Figure 4:
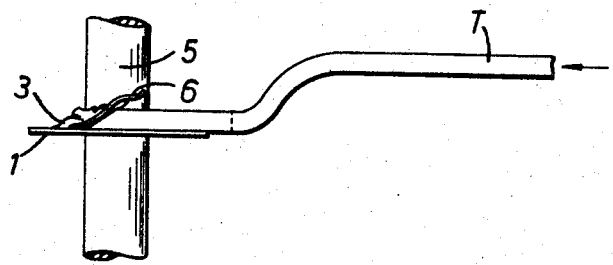
FIG. 4 is a side view of the assembly shown in FIG. 3 with the tool positioned in engagement with the means for releasing the ratchet plate.

As shown in the drawings, the ratchet plate is formed of spring steel or other suitable material and comprises a flat platelike base 1 having a central shaft or rod-receiving aperture 2. Part of the base adjacent one portion of the edge of the aperture is shaped and bent to provide an integral resilient tongue 3 which is capable of hinging movement relative to the base at its point of connection thereto. As shown more particularly in FIG. 3, the tongue has a concavely shaped fee end 4 adapted to make frictional gripping engagement with the peripheral surface of a shaft, or rod such as 5 which is inserted into the aperture 2.

Two resilient armlike elements 6, 7, extend respectively from opposite sides of the tongue transversely of the base in spaced relation thereto so that one arm is disposed at each of two opposed portions of the aperture. At a portion of the aperture in opposed relation to the tongue 3, a further resilient tongue 8 is provided.

The arms 6 and 7 are integral with the tongue 3 whose inner end is integrally connected to the base 1. The tongue and armlike elements initially extend at a small angle to the plane of the base such that when the rod 5 is moved axially through the aperture the free end 4 of the tongue 3 will be disposed to make frictional gripping engagement with the peripheral surface of the rod and bias it towards the further tongue 8 whereby the two tongues will make frictional gripping engagement with opposed portions of the rod to secure the ratchet plate thereto. It will be understood that the ratchet plate is assembled over the end of the rod and is adjusted in one direction along it to the desired position. Movement along the rod in an opposite direction will, however, normally be prevented by the tongues digging into the surface of the rod.

If it is desired to remove the ratchet plate from the rod, a tool such as T is provided including spaced arms 9, 10, having beveled free ends. To release the ratchet plate from the rod, the arms of the tool are moved across the base 1 of the ratchet plate so that they pass under the respective armlike elements 6 and 7. The thickness of the arms is such that they effect the pivotal movement of the armlike elements 6 and 7 and the tongue 3 away from the base whereby the tongue is moved out of gripping engagement with the rod 5 to permit the latter to be withdrawn through the aperture.

Figure 1:
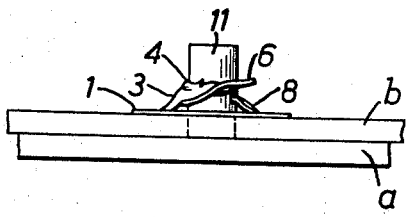
FIG. 1 is a side view of a ratchet plate according to one embodiment of the invention assembled on a rod forming a studlike projection of a support so as to secure a panel thereto.
Figure 2:
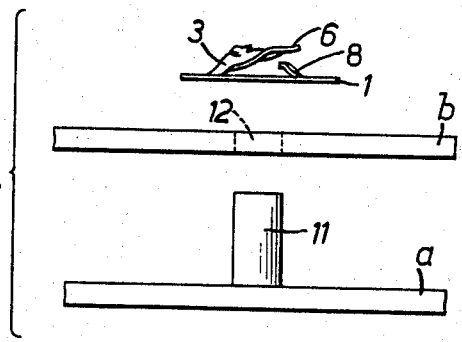
FIG. 2 is an exploded view of the assembly illustrated in FIG. 1.

The ratchet plate is particularly suitable for securing a panel-like member to a support having a projecting stud as shown in FIGS. 1 and 2 wherein the support is indicated by $a$ and is provided with a stud 11 which is adapted to extend through an aperture 12 in a panellike member $b$ so as to project outwardly thereof.

The ratchet plate is positioned over the projecting end of the stud until the base 1 abuts the outer surface of the panellike member $b$. The stud will then be firmly gripped by the tongues 3 and 8 and the member $b$ secured to the support $a$.

The panellike member $b$ is readily removed when desired by the use of a tool such as T as hereinbefore described.

We claim:

1. A ratchet plate formed of spring steel comprising a platelike base having an aperture through which a shaft or rod is adapted to be inserted, a resilient tongue integral with the base at a portion of the edge of the aperture, the tongue having a free edge adapted to make frictional engagement with the shaft or rod when inserted into the aperture, a pair of elongated arms extending from the said edge of the tongue and directed away from the junction of the tongue and the base, one arm extending from adjacent each of opposite ends of the said edge so that the respective arms are disposed on opposed sides of the aperture for engagement by a tool inserted over the base and forced laterally under the arms toward the junction of the tongue and the base to cammingly effect pivotal movement of the arms away from the base to release the gripping action of the tongue on the inserted shaft or rod.

2. A ratchet plate according to claim 1, wherein a second resilient tongue is formed integral with the base in opposed relation to the first-mentioned tongue.

3. A ratchet plate according to claim 2, wherein the said free edge of the first mentioned tongue is concavely shaped.